United States Patent
Grimm et al.

(10) Patent No.: US 7,784,859 B2
(45) Date of Patent: Aug. 31, 2010

(54) SUNROOF SYSTEM FOR A MOTOR VEHICLE

(75) Inventors: Rainer Grimm, Frankfurt (DE); Joachim Röder, Mühlheim (DE); Claudia Ries, Lichtenberg (DE); Manfred Röhnke, Rödermark (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 12/337,928

(22) Filed: Dec. 18, 2008

(65) Prior Publication Data

US 2009/0160223 A1 Jun. 25, 2009

(30) Foreign Application Priority Data

Dec. 19, 2007 (DE) .................. 10 2007 061 091

(51) Int. Cl.
*B60J 7/057* (2006.01)
(52) U.S. Cl. .................. 296/223; 296/216.03
(58) Field of Classification Search .................. 296/223, 296/216.03, 216.05, 221
See application file for complete search history.

(56) References Cited

U.S. PATENT DOCUMENTS 6,338,509 B1 * 1/2002 Rice et al. .................. 292/223
7,178,862 B2 * 2/2007 Oechel .................. 296/216.02

FOREIGN PATENT DOCUMENTS

| DE | 102005059286 | 6/2007 |
| EP | 0638452 | 2/1995 |
| EP | 1533159 | 5/2005 |

OTHER PUBLICATIONS

European Search Report dated Apr. 2, 2009.

\* cited by examiner

*Primary Examiner*—Dennis H Pedder
(74) *Attorney, Agent, or Firm*—Carlson, Gaskey & Olds

(57) ABSTRACT

A sunroof system for a motor vehicle includes two guide rails at least approximately parallel to one another and a slide in each guide rail. The slide is displaceable in a longitudinal direction of the vehicle. A front opening mechanism and a rear opening mechanism are assigned to a front edge and a rear edge, respectively, of a cover of the sunroof system. The front opening mechanism has a transmission lever and the rear opening mechanism has an opening lever. The slide, when displaced rearwards along the guide rail, is first coupled to the rear opening mechanism and then to the front opening mechanism.

9 Claims, 7 Drawing Sheets

_US 7,784,859 B2_

SUNROOF SYSTEM FOR A MOTOR VEHICLE

RELATED APPLICATION

This application claims priority to German Application No. 102007061091.4, which was filed Dec. 19, 2008.

TECHNICAL FIELD

The invention relates to a sunroof system for a motor vehicle. The invention relates in particular to a "spoiler sunroof system," in which a cover of the sunroof system can be moved rearwards and outwards over a fixed roof area. A special advantage of the system according to the invention is the provision of a low overall height, which is less than 40 mm.

SUMMARY OF THE INVENTION

A sunroof system for a motor vehicle includes two guide rails at least approximately parallel to one another. A slide in each guide rail is displaceable in a longitudinal direction of the motor vehicle. A front opening mechanism and a rear opening mechanism are assigned to a front edge and a rear edge, respectively, of a cover of the sunroof system. The front opening mechanism has a transmission lever and the rear opening mechanism has an opening lever. The slide, when displaced rearwards along the guide rail, is first coupled to the rear opening mechanism and then to the front opening mechanism.

These and other features of the present invention can be best understood from the following specification and drawings, the following of which is a brief description.

DETAILED DESCRIPTION OF THE PREFERRED EMBODIMENT

Figure 6:
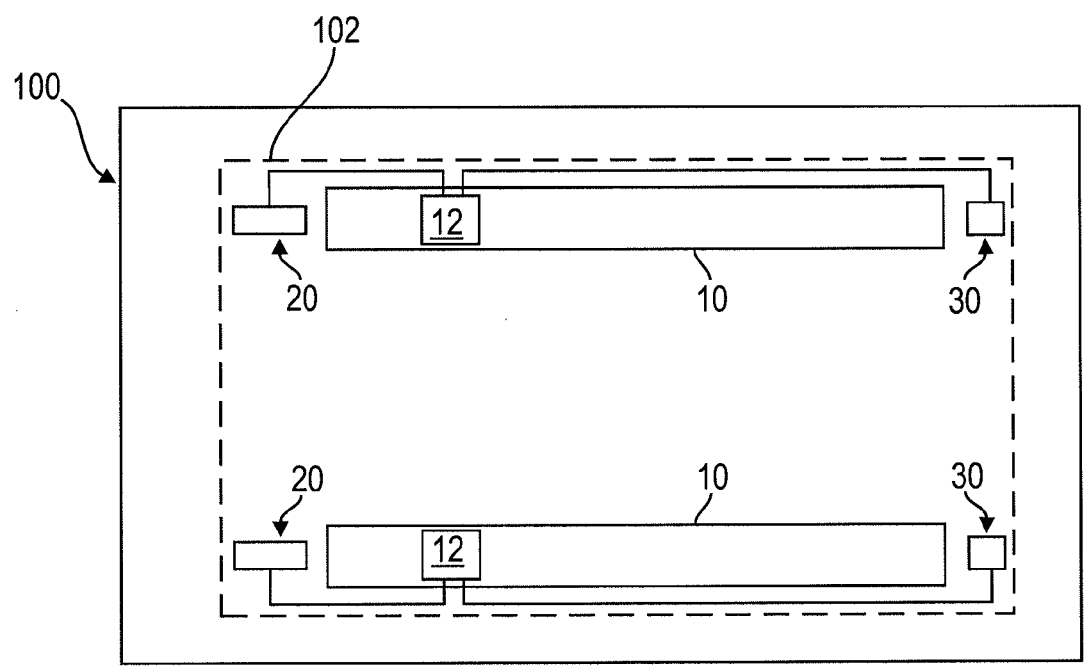
FIG. 6 shows a schematic representation of a vehicle roof with a pair of guide rails and front and rear opening mechanisms for a cover.

The sunroof system 100 has two guide rails 10 which lie opposite one another in parallel shown in FIG. 6. A slide 12 is displaceably arranged in each of the guide rails 10. The sunroof system 100 is converted from a state with a completely closed cover 102 into a state with a completely opened cover 102 by displacing the slide 12. The cover 102 is fastened in this case to a cover holder 14 shown in FIG. 1. The position of the cover holder 14, and thus of the cover 102, is determined by a front opening mechanism and a rear opening mechanism.

Figure 1:
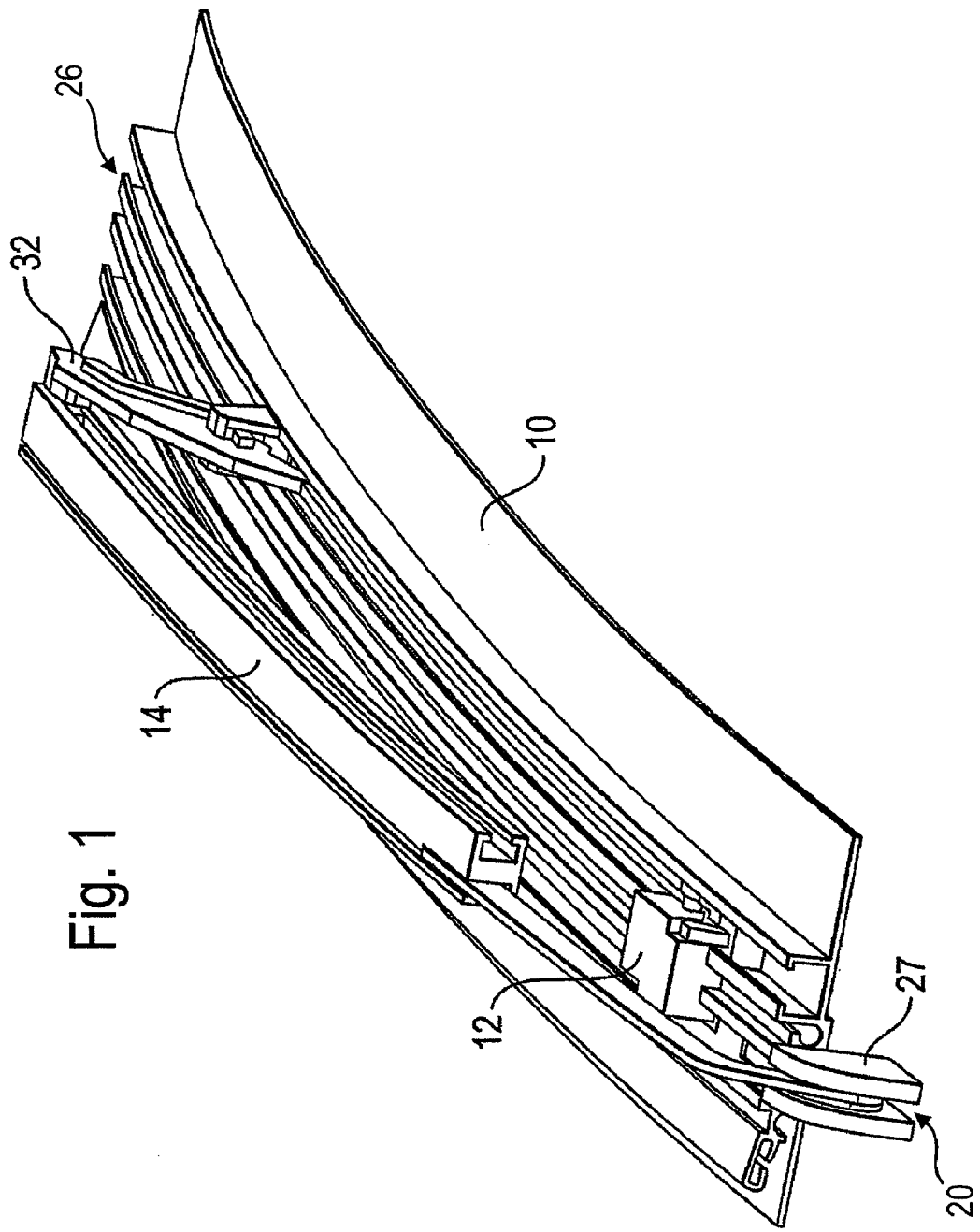
FIG. 1 shows a perspective view.
Figure 8:
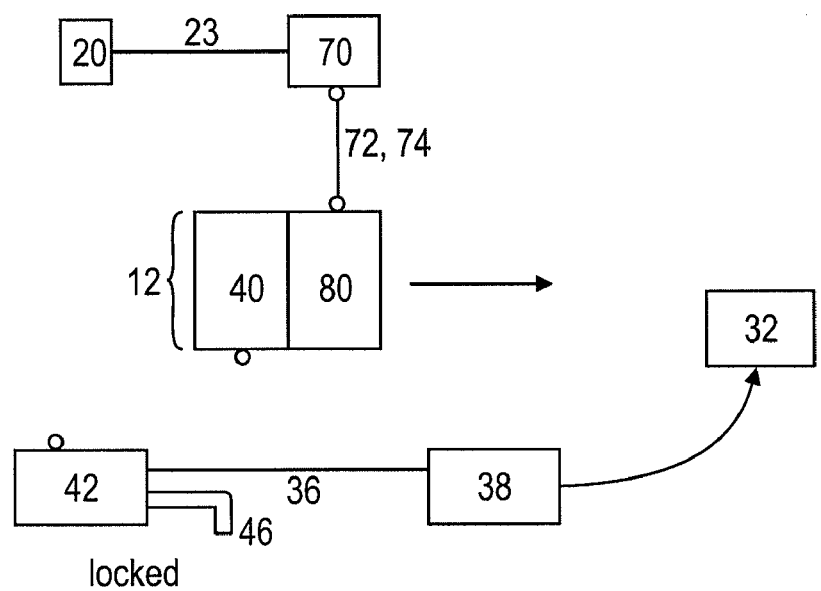
FIG. 8 shows a schematic representation in a second state where the push rod slide is disengaged from the slide with the opening lever being locked in a raised position, and showing a pull rod slide connected to a second driver to pull a toggle lever to allow the roof to be opened.

The front opening mechanism has a toggle lever 20 which connects three joints to one another. A first joint 22 is connected to a pull rod 23 which can be coupled to the slide 12 (FIG. 8). A second joint 24 is designed like a sliding block which can slide in a slotted guide link 26 of the guide rail 10. The joint 22 is also guided in this slotted link. A third joint 28 pivotally couples the toggle lever 20 to the cover holder 14. As shown in FIG. 1, the slotted guide link 26 extends along the guide rail 10 and has at its front corner, that is to say at the left-hand end in the figures, a lifting section 27 sloping steeply downwards. The slotted guide link 26, with the associated lifting section 27, is shown schematically in the remaining figures as a dashed line for purposes of clarity.

Figure 7:
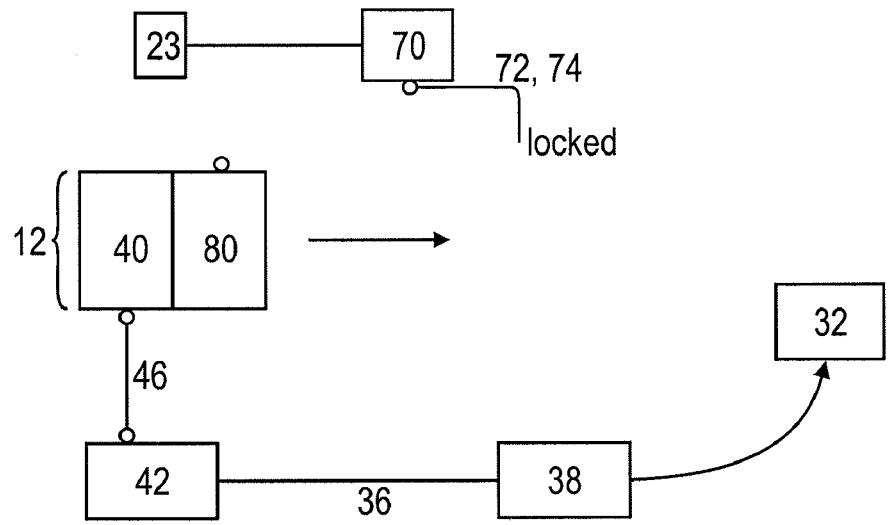
FIG. 7 shows a schematic representation of the system in an initial state where a first driver is connected to a push rod slide while a pull rod slide is locked, such that when the slide is moved to the right via the first driver, an opening lever is displaced to move the roof into a raised position.

The rear opening mechanism has a bearing block 30 which, in this embodiment, is arranged in a fixed position on the guide rail 10. Displaceably mounted in the bearing block 30 is an opening lever 32 which is provided with an opening rib 34. The latter slides in the bearing block 30. At its rear end, that is to say the right-hand end in the figures, the opening lever 32 is pivotally and displaceably coupled to the cover holder 14. At its front end, it is fixedly coupled to a push rod 36 which is displaceably guided in the guide rail 10 via a sliding block 38 and can be coupled at its front end to the slide 12 (FIG. 7).

Figure 2:
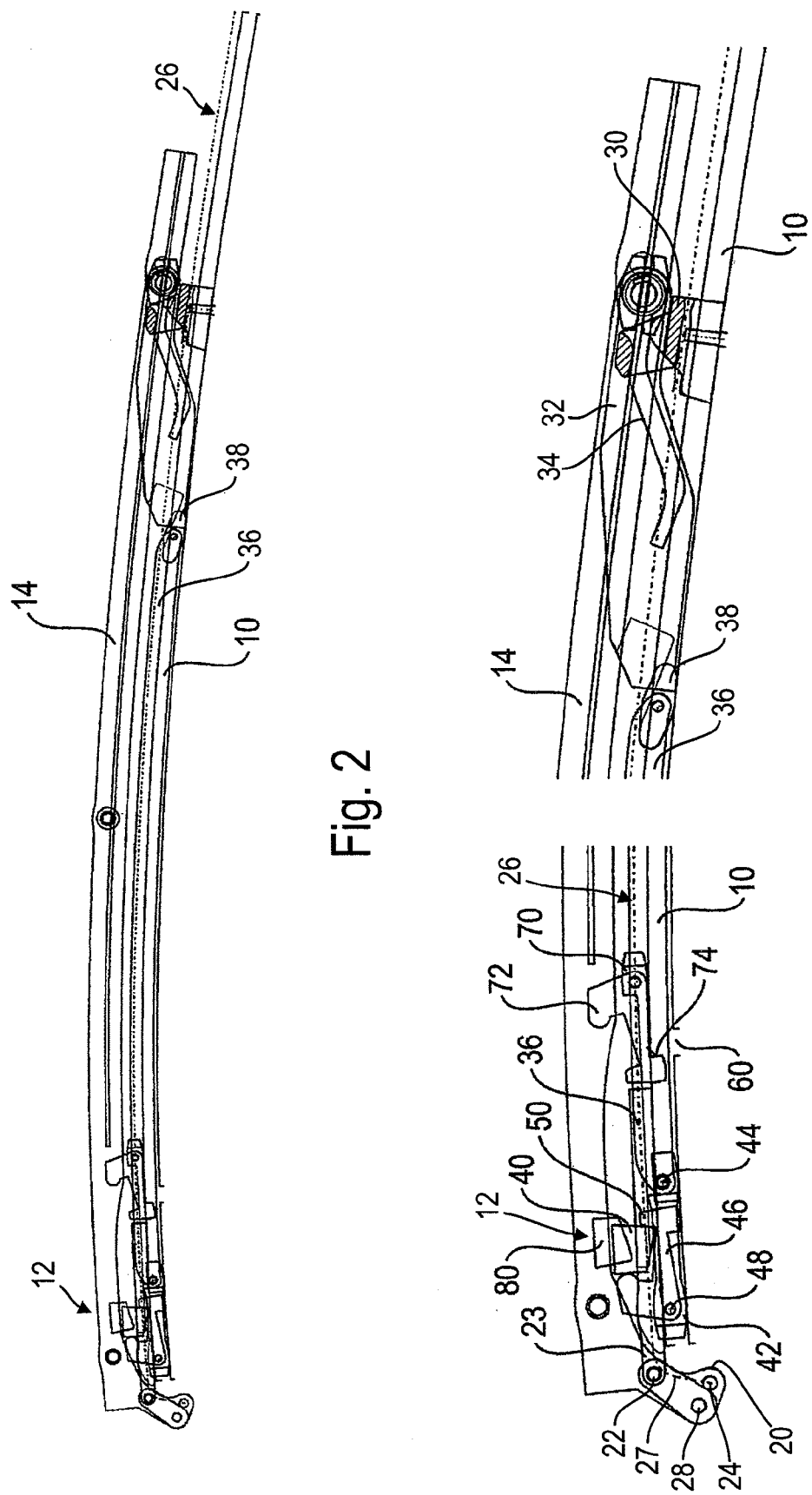
FIG. 2 shows the system in a completely closed state, an overall side view being shown at the top and an enlarged detail of the front and the rear section being shown at the bottom.
Figure 3:
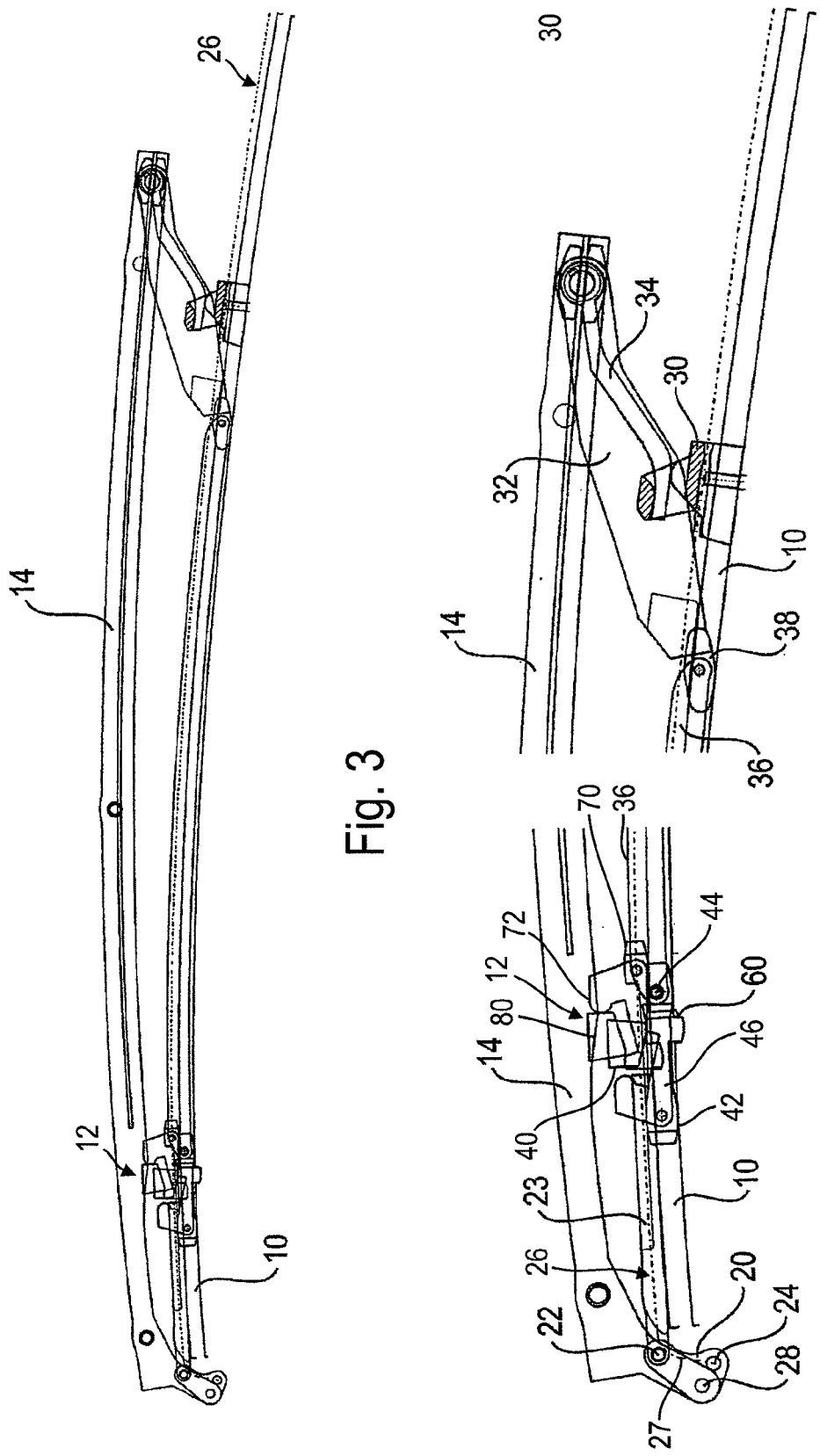
FIG. 3 shows, in views corresponding to FIG. 2, the system in a "ventilation position", in which the rear end of the cover is opened outwards.

The slide 12, in the initial state shown in FIG. 2, in which it is shifted forwards or to the left to the maximum extent, is coupled to the push rod 36 via a driver 40. Provided for this purpose is a push-rod slide 42 which is displaceably accommodated in the guide rail 10 and is coupled to the push rod 36 via a joint 44. Pivotally accommodated on the push-rod slide 42 is a latching hook 46, which is designed here as a two-armed lever and is pivotable about a joint 48. The two arms of the latching hook 46 are approximately at right angles to one another, and the lower arm, which extends approximately horizontally in the guide rail 10, is provided with a latching extension at its front end at the bottom and with a retaining lug 50 at the top. In the position shown in FIG. 2, the latching extension is supported on a guide surface of the guide rail 10 and retains the latching hook in its "top" position, in which the retaining lug 50 overlaps the driver 40. The push-rod slide 42 is therefore coupled to the slide 12 via the driver 40. When the slide 12 is shifted to the right, it drives the push-rod slide 42, which in turn displaces the opening lever 32 to the right via the push rod 36, as a result of which the opening lever 32 is pivoted into the opened-out position shown in FIG. 3. The maximum opened-out position is reached as soon as the latching projection of the latching hook 46 can plunge into a latching recess 60 which is provided in the base of the guide slide. The latching hook 46 is pivoted slightly clockwise due to the plunging, such that it releases the driver 40. At the same time, the push rod 36 is locked relative to the guide rail 10.

After the release of the latching hook 46, the slide 12 is coupled up to a pull-rod slide 70 which is provided with a latching hook 72. In the initial position shown in FIG. 2, the latter is latched in place in a latching opening 74, such that the pull rod 23 coupled to the pull-rod slide is held stationary in the longitudinal direction (FIG. 8). The slide 12, during its further movement to the right, drives the pull-rod slide 70 with a driver 80 by virtue of the fact that it runs onto the upwardly extending arm of the latching hook 72 and pivots the latter clockwise, such that it is pivoted out of the latching opening 74. It is then driven to the right, in the course of which the toggle lever 20 is pulled upwards via the pull rod 23 and is then pivoted clockwise (cf. FIGS. 3 and 4), as a result of which a transmission effect occurs. By the pivoting of the toggle lever 20 by just under 90°, the joint 28 and thus the cover holder 14 in the front region are raised by an amount which is greater than the vertical movement of the joint 24 in the slotted guide link 26.

Figure 4:
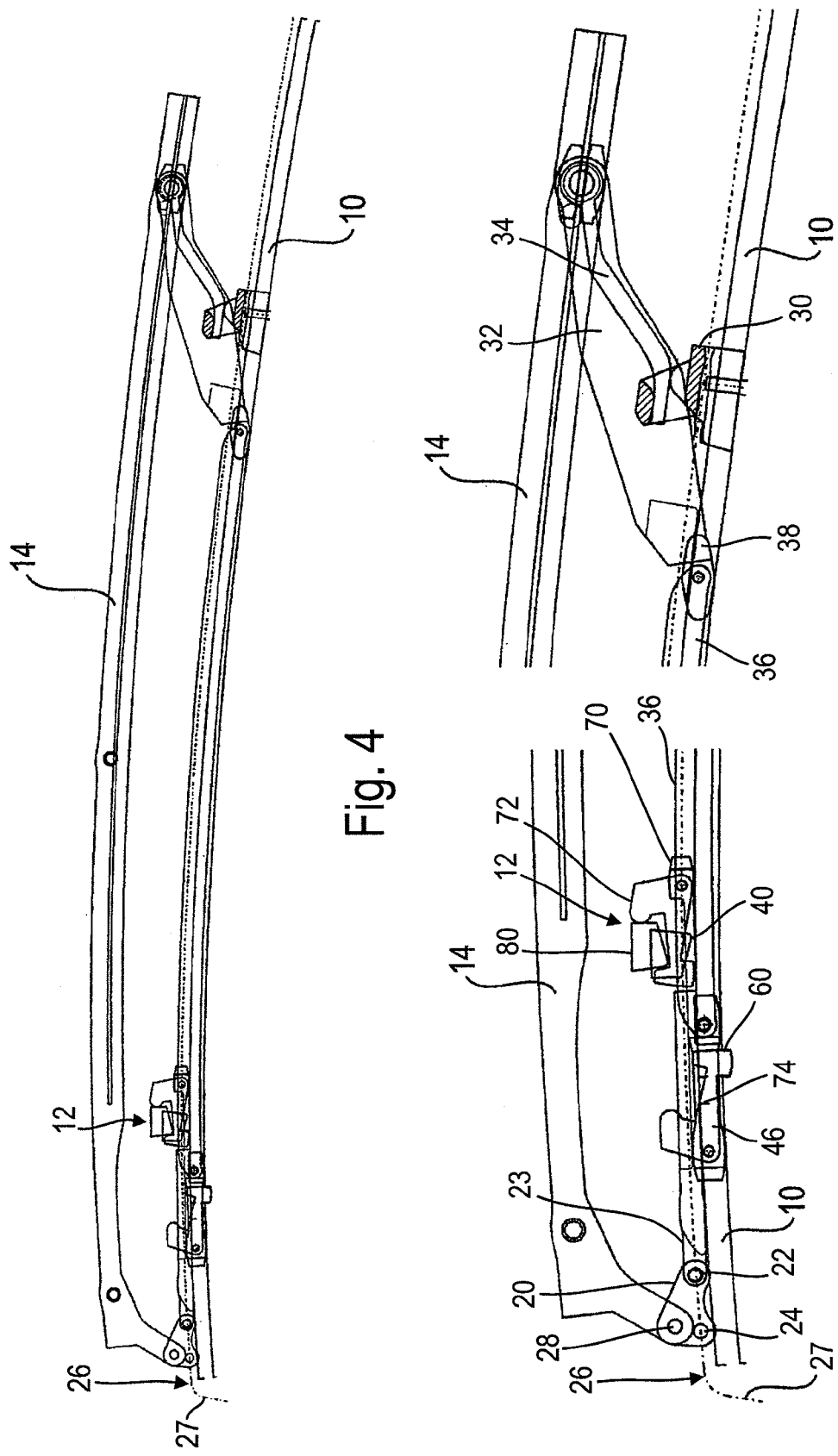
FIG. 4 shows, in views corresponding to FIG. 2, the system in an intermediate position, in which the front edge of the cover is also completely opened out.
Figure 5:
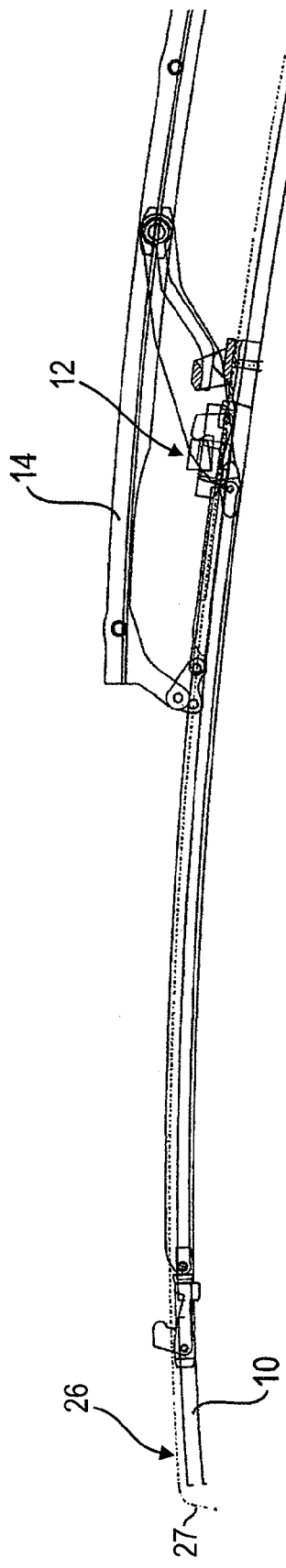
FIG. 5 shows, in views corresponding to FIG. 2, the system in a state with completely opened cover.
Figure 5:
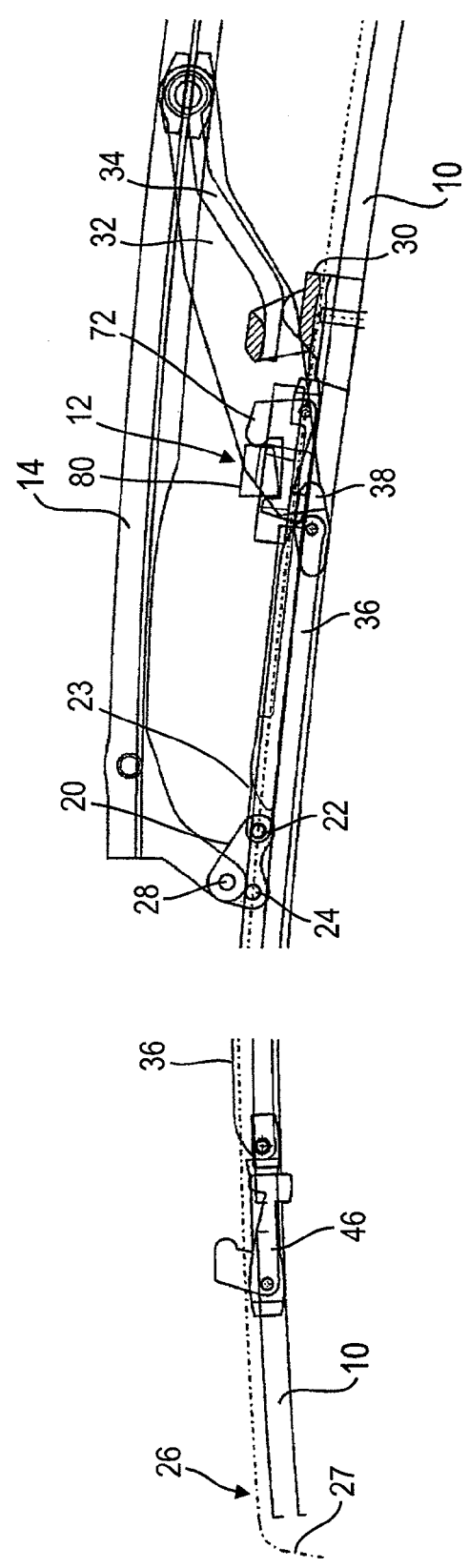

Once the sunroof system has achieved the state shown in FIG. 4, in which the cover holder 14 is opened out to the maximum extent, the cover holder 14 can be displaced rearwards by further displacement of the slide 12 until it has reached the end position shown in FIG. 5. In the process, the cover holder 14 is displaced relative to the opening lever.

It is also conceivable for the bearing block 30, subsequent to the position shown in FIG. 5, to be locked and driven further rearwards.

When the cover of the sunroof is to be closed again, the slide is shifted forwards. As a result, the movement takes place in the reverse order. First of all, therefore, the front opening mechanism is displaced forwards via the pull rod until the toggle lever plunges into the lifting section 27 of the slotted guide link 26. The slide is then re-coupled, such that the rear opening mechanism is lowered again.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A sunroof system for a motor vehicle comprising:
   two guide rails generally parallel to one another, each of the two guide rails having a lifting section at one end;
   a slide in each guide rail, the slide being displaceable in a longitudinal direction of the motor vehicle; and
   a front opening mechanism and a rear opening mechanism assigned to a front edge and a rear edge, respectively, of a cover of the sunroof system, wherein the front opening mechanism has a transmission lever and the rear opening mechanism has an opening lever, and wherein the slide, when displaced rearwards along the guide rail, is first coupled to the rear opening mechanism and then to the front opening mechanism; and
   wherein the transmission lever comprises a toggle lever having a first joint coupled to the slide and being guided in the respective guide rail, a second joint guided in the respective guide rail, and a third joint connected to the front edge of the cover such that by pivoting the toggle lever, the front edge of the cover is raised by an amount that is greater than an amount of vertical movement of the second joint in the respective lifting section of the guide rail.

2. The sunroof system according to claim 1, wherein each opening mechanism has a latching hook which can be automatically coupled to the slide.

3. The sunroof system according to claim 1, wherein the first joint is coupled to a pull rod that can be coupled to the slide and which slides within a slotted guide link of the respective guide rail.

4. The sunroof system according to claim 1, wherein the second joint comprises a sliding block that slides within a slotted guide link of the respective guide rail.

5. The sunroof system according to claim 1, wherein the third joint pivotally couples the toggle lever to a cover holder that is mounted to the cover.

6. The sunroof system according to claim 1, wherein the lifting section is at a forward end of the respective guide rail near the front edge of the cover.

7. The sunroof system according to claim 1, wherein the first joint is coupled to a pull rod that can be coupled to the slide and which slides within a slotted guide link of the respective guide rail, and wherein the second joint comprises a sliding block that slides within the slotted guide link of the respective guide rail; and wherein the third joint pivotally couples the toggle lever to a cover holder that is mounted to the cover.

8. The sunroof system according to claim 1, wherein the slide includes a first driver operably associated with a push rod slide and a second driver operably associated with a pull rod slide.

9. The sunroof system according to claim 8, including a first latching hook that selectively couples the push rod slide to the first driver and a second latching hook that selectively couples the pull rod slide to the second driver.

* * * * *